Patented Mar. 29, 1938

2,112,749

UNITED STATES PATENT OFFICE 2,112,749

METHOD OF PREPARATION OF NITROISO-BUTYLGLYCEROL TRINITRATE AND NI-TROISOBUTYLGLYCOL DINITRATE

Willard de C. Crater, Newark, Del., assignor to Hercules Powder Company, Wilmington, Del., a corporation of Delaware No Drawing. Application October 16, 1936, Serial No. 105,887

8 Claims. (Cl. 260—144)

This invention relates to nitroisobutylglycerol trinitrate and nitroisobutylglycol dinitrate and method of preparation thereof.

Heretofore, in the preparation of nitroisobutylglycerol trinitrate or nitroisobutylglycol dinitrate by addition of nitroisobutylglycerol or nitroisobutylglycol to mixed acid, i. e., a nitrating mixture of concentrated sulfuric and nitric acids, to prepare the polynitrate thereof, it has been found that washing the nitroisobutylglycerol trinitrate or nitroisobutylglycol dinitrate, which are viscous liquids at the temperature used in washing and stabilization, with alkaline solutions to remove the absorbed acids, forms emulsions, at times as thick as mayonnaise, and almost impossible to break by any practical means. Furthermore, in the use of sodium carbonate, or a like alkali, for neutralizing and washing nitroisobutylglycerol trinitrate or nitroisobutylglycol dinitrate, the latter two decompose partially.

These difficulties have prevented commercial use of nitroisobutylglycerol trinitrate or nitroisobutylglycol dinitrate, which are otherwise very attractive as commercial explosives, both as regards strength and ease and cheapness of preparation.

I have found that both the emulsion difficulty and decomposition difficulty above mentioned may be very readily overcome by the use in neutralization and stabilization of washes of nitroisobutylglycerol trinitrate or nitroisobutylglycol dinitrate, of an alkali sulfite, e. g., sulfites of sodium, potassium or ammonium, or mixtures thereof with alkali carbonates or bicarbonates.

I am aware that sodium sulfite and the like have heretofore been used for washing explosives, but not for the purpose in accordance with my invention. For example, U. S. Patent 1,297,524, shows the use of an alkali sulfite for the purification of trinitrotoluene, the main impurities of which consist in isomeric trinitrotoluenes having the nitro group in the meta position to the methyl group, such being termed beta- and gamma isomers, which are dissolved more readily by alkali sulfites than are the alpha isomers. No emulsification or decomposition effects are involved.

I have found, to my surprise, that alkali sulfites or mixtures thereof with alkali carbonates or bicarbonates, can be used for washing and stabilization of nitroisobutylglycerol trinitrate or nitroisobutylglycol dinitrate, without the formation of the emulsions thereof formed by the use of alkali hydroxides or carbonates, and without the decomposition effects also caused by the use of alkali hydroxides or carbonates. This result was in no way to be predicted.

As an example of my method of washing and stabilizing nitroisobutylglycerol trinitrate, I take 250 parts by weight of the same, directly after nitration and separation of the spent acids therefrom, and wash twice with about an equal volume of water at about 110° F., settle the nitrate out of the wash water, and wash with a solution containing, for example, about 50 parts by weight of sodium sulfite in a volume of water equal to about 1.5 times the volume of the nitroisobutylglycerol trinitrate, agitate by compressed air for about 20 minutes at a temperature of about 110° F., then cut off the compressed air agitation. The viscous, oily nitroisobutylglycerol trinitrate settles rapidly, without formation of emulsions. The nitroisobutylglycerol trinitrate is then removed to another container and given a second sodium sulfite wash under the same conditions as before. At the conclusion of the second wash, the solution should turn phenolphthalein paper pink.

As a further example of my method of washing and stabilizing nitroisobutylglycerol trinitrate, I take 250 parts by weight of the same, directly after nitration and separation of the spent acids therefrom, and wash the trinitrate with about 15 parts by weight of sodium carbonate in a volume of water about equal to 1.5 times the volume of the nitroisobutylglycerol trinitrate, agitate the mixture, e. g. by bubbling compressed air therethrough, for 20 minutes at a temperature of about 105° F., stop the agitation, and allow the trinitrate to settle. As much of the wash water as possible is then removed, and the trinitrate then given a wash comprising about 15-50 parts by weight of sodium sulfite in about 1.5 volumes of water per 1 volume of trinitrate, the mixture agitated 15-20 minutes at a temperature of about 105° F., allowed to settle, and the purified, stabilized nitroisobutylglycerol trinitrate drawn off for use.

As an example of the use of a mixture of alkali sulfite and alkali carbonate, I may operate as in the first example above, using about 15 parts by weight of sodium sulfite and 15 parts by weight of sodium carbonate in about 1.5 volumes of water per volume of nitroisobutylglycerol trinitrate, agitate the mixture about 20 minutes, allow to settle, and draw off stabilized nitroisobutylglycerol trinitrate for use.

As an example of my method of washing and stabilizing nitroisobutylglycol dinitrate, I may operate therewith by the procedures given in the first example above, care being taken to observe the temperature of washing of 110° F., since nitroisobutylglycol dinitrate melts at about 106° F.

The above-described procedure is applicable to the purification, not only of nitroisobutylglycerol trinitrate and nitroisobutylglycol dinitrate, but to the purification of various mixtures thereof with nitroglycerin, ethylene glycol dinitrate, glycerol monochlorhydrin dinitrate, and the like, since it has been found that such mixtures, when washed with alkali hydroxides or carbonates, also form emulsions very difficult to break, and also undergo decomposition of the nitroisobutylglycerol trinitrate or nitroisobutylglycol dinitrate component thereof.

In my process of stabilization of nitroisobutylglycerol trinitrate or nitroisobutylglycol dinitrate, or mixtures thereof with other liquid or solid explosives, it will be understood that I do not limit myself to the quantities, number of washes, temperatures, or other conditions stated in the above example, such being given merely by way of illustration, and I may vary such conditions, within limits of safety, as may be desirable or necessary, all as will be apparent to one skilled in the art.

What I claim and desire to protect by Letters Patent is:

1. Process of preparation of a substance from the group consisting of nitroisobutylglycerol trinitrate and nitroisobutylglycol dinitrate comprising nitrating the corresponding alcohol in a nitrating acid, separating the corresponding alcohol nitrate therefrom, washing said corresponding alcohol nitrate with water, washing and stabilizing said corresponding alcohol nitrate with an aqueous solution of a substance from the group consisting of alkali metal sulfites and ammonium sulfites, and settling said corresponding alcohol nitrate from said aqueous sulfite solution.

2. Process of preparation of a substance from the group consisting of nitroisobutylglycerol trinitrate and nitroisobutylglycol dinitrate, comprising nitrating the corresponding alcohol in a nitrating acid, separating the corresponding alcohol nitrate therefrom, washing said corresponding alcohol nitrate with water, washing and stabilizing said corresponding alcohol nitrate with an aqueous solution of a substance from the group consisting of alkali metal sulfites and ammonium sulfites at a temperature of about 110° F., and settling said corresponding alcohol nitrate from said aqueous sulfite solution.

3. Process of preparation of a substance from the group consisting of nitroisobutylglycerol trinitrate and nitroisobutylglycol dinitrate comprising nitrating the corresponding alcohol in a nitrating acid, separating the corresponding alcohol nitrate therefrom, washing said corresponding alcohol nitrate with water, washing and stabilizing said corresponding alcohol nitrate with an aqueous solution of sodium sulfite at a temperature of about 110° F., and settling said corresponding alcohol nitrate from said aqueous sodium sulfite solution.

4. Process of preparation of a substance from the group consisting of nitroisobutylglycerol trinitrate and nitroisobutylglycol dinitrate comprising nitrating the corresponding alcohol in a nitrating acid, separating the corresponding alcohol nitrate therefrom, washing said corresponding alcohol-nitrate with water, washing and stabilizing said corresponding alcohol nitrate with an aqueous solution of ammonium sulfite at a temperature of about 110° F., and settling said corresponding alcohol nitrate from said aqueous ammonium sulfite solution.

5. Process of preparation of mixtures of a substance from the group consisting of nitroisobutylglycerol trinitrate and nitroisobutylglycol dinitrate and a member of the group consisting of nitroglycerin, ethylene glycol dinitrate and glycerol monochlorohydrin dinitrate comprising nitrating a mixture of the corresponding alcohols in a nitrating acid, separating the mixture of the corresponding alcohol nitrates therefrom, washing said mixture of corresponding alcohol nitrates with water, washing and stabilizing said mixture of corresponding alcohol nitrates with an aqueous solution of a substance from the group consisting of alkali metal sulfites and ammonium sulfites, and settling said mixture of corresponding alcohol nitrates from said aqueous sulfite solution.

6. Process of preparation of mixtures of nitroisobutylglycerol trinitrate and nitroisobutylglycol dinitrate comprising nitrating a mixture of nitroisobutylglycerol and nitroisobutylglycol in a nitrating acid, separating said nitrated alcohol mixture therefrom, washing said nitrated alcohol mixture with water, washing and stabilizing said nitrated alcohol mixture with an aqueous solution of a substance from the group consisting of alkali metal sulfites and ammonium sulfites, and separating said nitrated alcohol mixture from said aqueous sulfite solution.

7. Process of preparation of mixtures of a substance from the group consisting of nitroisobutylglycerol trinitrate and nitroisobutylglycol dinitrate and a member of the group consisting of nitroglycerin, ethylene glycol dinitrate and glycerol monochlorohydrin dinitrate, comprising nitrating a mixture of the corresponding alcohols in a nitrating acid, separating the mixture of the corresponding alcohol nitrates therefrom, washing said mixture of corresponding alcohol nitrates with water, washing said mixture of corresponding alcohol nitrates with an aqueous alkali metal carbonate solution, washing and stabilizing said mixture of corresponding alcohol nitrates with an aqueous solution of a substance from the group consisting of alkali metal sulfites and ammonium sulfite, and settling said mixture of corresponding alcohol nitrates from said aqueous sulfite solution.

8. Process of preparation of mixtures of a substance from the group consisting of nitroisobutylglycerol trinitrate and nitroisobutylglycol dinitrate and a member of the group consisting of nitroglycerin, ethyleneglycol dinitrate and glycerol monochlorohydrin dinitrate, comprising nitrating a mixture of the corresponding alcohols in a nitrating acid, separating the mixture of the corresponding alcohol nitrates therefrom, washing said mixture of corresponding alcohol nitrates with water, washing and stabilizing said mixture of corresponding alcohol nitrates with an aqueous solution of an alkali metal carbonate and a substance from the group consisting of alkali metal sulfite and ammonium sulfite, and settling said mixture of corresponding alcohol nitrates from said aqueous stabilizing solution.

WILLARD DE C. CRATER.